(12) United States Patent
Yamaguchi (10) Patent No.: US 9,586,622 B2
(45) Date of Patent: Mar. 7, 2017

(54) VEHICLE BODY STRUCTURE

(71) Applicant: HONDA MOTOR CO., LTD., Tokyo (JP)

(72) Inventor: Tomoki Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/071,271

(22) Filed: Mar. 16, 2016

(65) Prior Publication Data

US 2016/0272251 A1    Sep. 22, 2016

(30) Foreign Application Priority Data

Mar. 16, 2015    (JP) .................... 2015-052158

(51) Int. Cl.
*B62D 25/00*    (2006.01)
*B62D 25/04*    (2006.01)
*B62D 25/20*    (2006.01)
*B62D 33/06*    (2006.01)

(52) U.S. Cl.
CPC ......... *B62D 25/04* (2013.01); *B62D 25/2036* (2013.01); *B62D 33/06* (2013.01)

(58) Field of Classification Search
CPC ..... B62D 25/04; B62D 25/2036; B62D 33/06
USPC ..................... 296/193.06, 146.11
See application file for complete search history.

(56) References Cited

U.S. PATENT DOCUMENTS 8,262,152 B2 *    9/2012    Okumura ............. B62D 21/157
                                                                                                        296/187.12
2013/0241239 A1 *    9/2013    Mori .................... B62D 21/157
                                                                                                        296/193.06

FOREIGN PATENT DOCUMENTS

JP    5131065 B2    1/2013

* cited by examiner

*Primary Examiner* — Joseph D Pape
(74) *Attorney, Agent, or Firm* — Westerman, Hattori, Daniels & Adrian, LLP (57) ABSTRACT

Junction regions are formed by mutually joined side portions of a pillar inner and a pillar outer, and an opening-defining region is formed by mutually spaced side portions of the pillar inner and the pillar outer. The junction regions include a first junction region adjacent to the opening-defining region on one side in a longitudinal direction and a second junction region adjacent to the opening-defining region on the other side in the longitudinal direction. A bypass connection wall connecting the opening-defining region and at least one of the first junction region and the second junction region extends from at least one of the pillar inner and the pillar outer.

12 Claims, 10 Drawing Sheets

VEHICLE BODY STRUCTURE

CROSS REFERENCES TO RELATED APPLICATIONS

The present application claims priority under 35 U.S.C. §119 to Japanese Patent Application No. 2015-052158, filed Mar. 16, 2015, entitled "Vehicle Body Structure." The contents of this application are incorporated herein by reference in their entirety.

TECHNICAL FIELD

The present disclosure relates to a vehicle body structure including a pillar having a hollow cross section continuously extending in a longitudinal direction.

BACKGROUND

Vehicles are provided in some parts with a pillar having a hollow cross section to maintain rigidity of a vehicle body (see, for example, Japanese Patent No. 5131065).

In a vehicle body structure disclosed in Japanese Patent No. 5131065, a center pillar on a lateral side of a vehicle is formed to have a hollow cross section continuously extending in a longitudinal direction by joining a pillar inner and a pillar outer at both sides. A harness-fitting hole is defined on the pillar outer at a certain location in the longitudinal direction, and a harness for operating a door-locking mechanism and a power window is inserted through the harness-fitting hole.

SUMMARY

However, the vehicle body structure disclosed in Japanese Patent No. 5131065 carries the risk of a reduction in flexural and torsional rigidity of the pillar (center pillar) in the longitudinal direction when the harness-fitting hole has a large opening area, because the harness-fitting hole is defined on the pillar outer at a certain location in the longitudinal direction.

The present application describes a vehicle body structure that includes an opening-defining region on the pillar at a certain location in the longitudinal direction and can still maintain high flexural and torsional rigidity of the pillar in the longitudinal direction. In the following explanation of the exemplary embodiment, specific elements with their reference numerals are indicated by using brackets. These specific elements are presented as mere examples in order to facilitate understanding, and thus, should not be interpreted as any limitation to the accompanying claims.

For example, a vehicle body structure according to one embodiment includes a pillar (for example, a pillar 25 in the embodiment) having a hollow cross section continuously extending in the longitudinal direction and formed by joining a pillar inner (for example, a pillar inner portion 22 in the embodiment) and a pillar outer (for example, a pillar outer 24 in the embodiment) on both sides. Junction regions (for example, a first junction region A1 and a second junction region A2 in the embodiment) are formed by mutually joined side portions of the pillar inner and the pillar outer on at least one of the sides, and an opening-defining region (for example, an opening-defining region A3 in the embodiment) is formed by mutually spaced side portions of the pillar inner and the pillar outer on the at least one of the sides. The junction regions include a first junction region (for example, the first junction region A1 in the embodiment) adjoining the opening-defining region on one side in the longitudinal direction and a second junction region (for example, the second junction region A2 in the embodiment) adjoining the opening-defining region on the other side in the longitudinal direction. A bypass connection wall (for example, a bypass connection wall 32 in the embodiment) connecting the opening-defining region and at least one of the first junction region and the second junction region extends from at least one of the pillar inner and the pillar outer.

With this structure, the opening-defining region of the side portions of the pillar inner and the pillar outer is connected to at least one of the rigid first junction region and the rigid second junction region via the bypass connection wall. This allows the bypass connection wall to increase the rigidity of the opening-defining region at which the pillar inner and pillar outer are mutually spaced and are not joined. A force acting on around the opening-defining region of the pillar is carried accordingly by at least one of the first junction region and the second junction region through the bypass connection wall.

The bypass connection wall may include a first reinforcing wall portion (for example, a first reinforcing wall portion 30 in the embodiment) connected to the opening-defining region, a second reinforcing wall portion (for example, a second reinforcing wall portion 31 in the embodiment) joined to at least one of the first junction region and the second junction region at a position apart from the first reinforcing wall portion in the longitudinal direction of the pillar, and a connection wall portion (for example, a right side 21R in the embodiment) connecting the first reinforcing wall portion and the second reinforcing wall portion at a position apart from the pillar.

In this case, the force acting on around the opening-defining region of the pillar is carried by at least one of the first junction region and the second junction region through the first reinforcing wall portion, the connection wall portion, and the second reinforcing wall portion.

One end of the first reinforcing wall portion may be connected to the opening-defining region and joined to the first and second junction regions so as to extend over the first and second junction regions.

In this case, the first and second junction regions are partially joined via one end of the first reinforcing wall portion, and flexural and torsional rigidity of the pillar in the longitudinal direction can thereby be further increased.

The side portions of the pillar inner and the pillar outer may include side flanges (for example, a side flange 22Rf and a side flange 24Rf in the embodiment) continuously extending in the longitudinal direction so as to face each other, and the opening-defining region may be formed by the side flange of the pillar inner and the side flange of the pillar outer that are curved in directions away from each other.

In this case, the side flanges of the side portions of the pillar inner and the pillar outer are curved at the opening-defining region but extend continuously, and the flexural rigidity of the side flanges is increased not only in the thickness direction but also in the width direction.

The opening-defining region of the pillar may define an opening through which a linear member (for example, a distribution cable 8 in the embodiment) connected to a functional component (for example, lamp 18, camera 19, or switch 20 in the embodiment) of a vehicle passes, and the opening-defining region may be situated at substantially the same position in the longitudinal direction of the pillar as the functional component.

In this case, the linear member is inserted through the opening-defining region of the pillar and connected to the functional component situated at substantially the same position in the longitudinal direction as the opening-defining region, and the linear member can thereby be sufficiently shortened to simplify routing of the linear member.

The pillar may be provided with a plurality of hinges (for example, hinges 26 in the embodiment) that openably and closably support a door and are disposed apart from each other in the longitudinal direction, and the opening-defining region of the pillar is situated at a substantially middle position between two of the hinges adjoining in the longitudinal direction.

The opening-defining region of the pillar is situated at the farthest position from the two hinges supporting the weight of the door, and the load of the door applied to the hinges is thereby carried by portions of the pillar that are advantageous in view of rigidity. Accordingly, the door is stably supported by the pillar.

According to the embodiment, the rigidity of the opening-defining region of the side portion of the pillar is increased through the bypass connection wall, and a high degree of flexural and torsional rigidity of the pillar in the longitudinal direction is maintained, although the opening-defining region is provided on the pillar at a certain location in the longitudinal direction.

BRIEF DESCRIPTION OF THE DRAWINGS

The advantages of the disclosure will become apparent in the following description taken in conjunction with the following drawings.

DETAILED DESCRIPTION

An embodiment will hereinafter be described with reference to the drawings. The terms "upper and lower" and "front and rear", used herein, refer to being upper and lower and being front and rear with respect to a vehicle, unless otherwise indicated.

Figure 1:
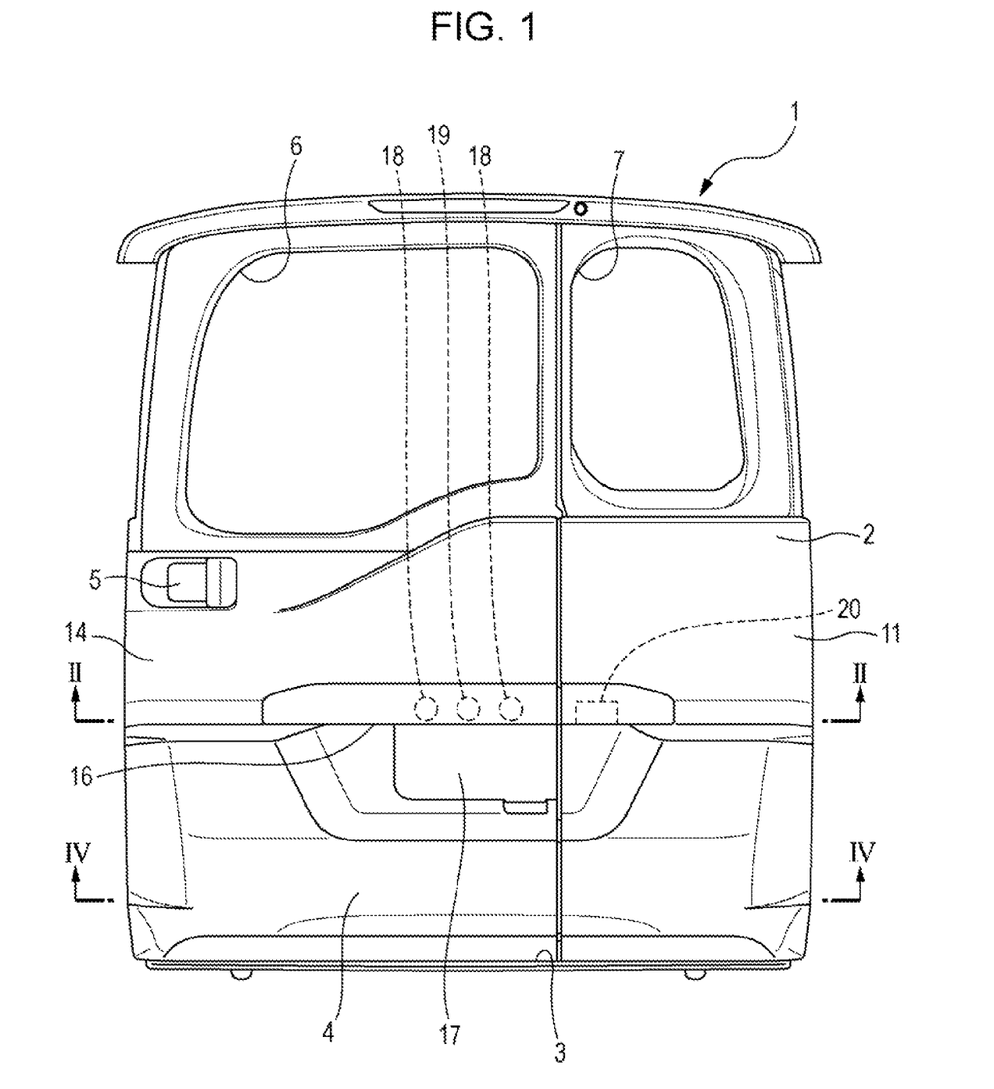
FIG. 1 is a front view of a tailgate of a vehicle according to an embodiment.

FIG. 1 is a diagram showing a tailgate 1 of a vehicle according to the embodiment. The vehicle according to the embodiment is a wagon-type vehicle including at the tail of a vehicle body the tailgate 1 that can be swung upward. The tailgate 1 is provided with a door opening 3 on a tailgate body 2, and a door 4 that can be horizontally swung open and close is provided within the door opening 3. The door 4 has a width of about two-thirds the width of the tailgate body 2 and is hinged at the inner side in the direction of the vehicle width so as to be openable toward the exterior of the vehicle (e.g., toward the rear). In FIG. 1, a door knob of the door 4 is indicated by 5, and windows provided at the upper part of the door 4 and the tailgate body 2 are indicated by 6 and 7.

Figure 2:
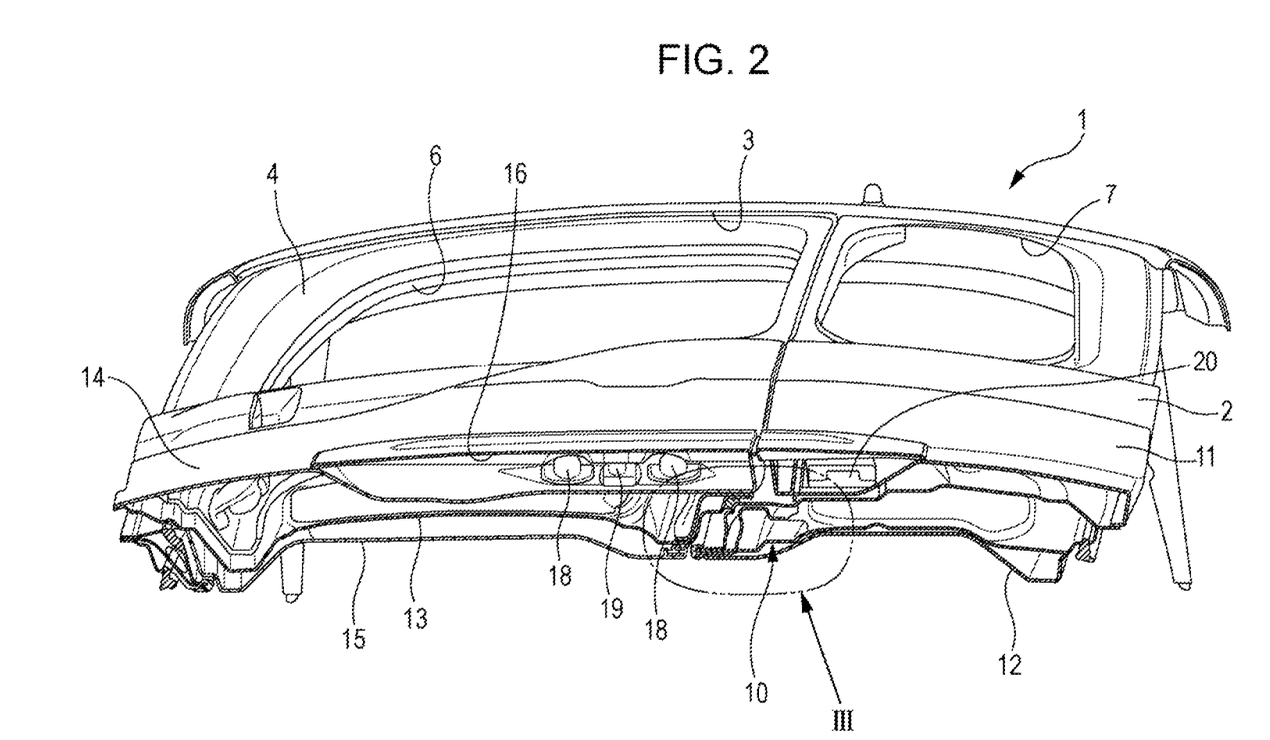
FIG. 2 is a cross-sectional view of the tailgate according to the embodiment along line II-II shown in FIG. 1.
Figure 3:
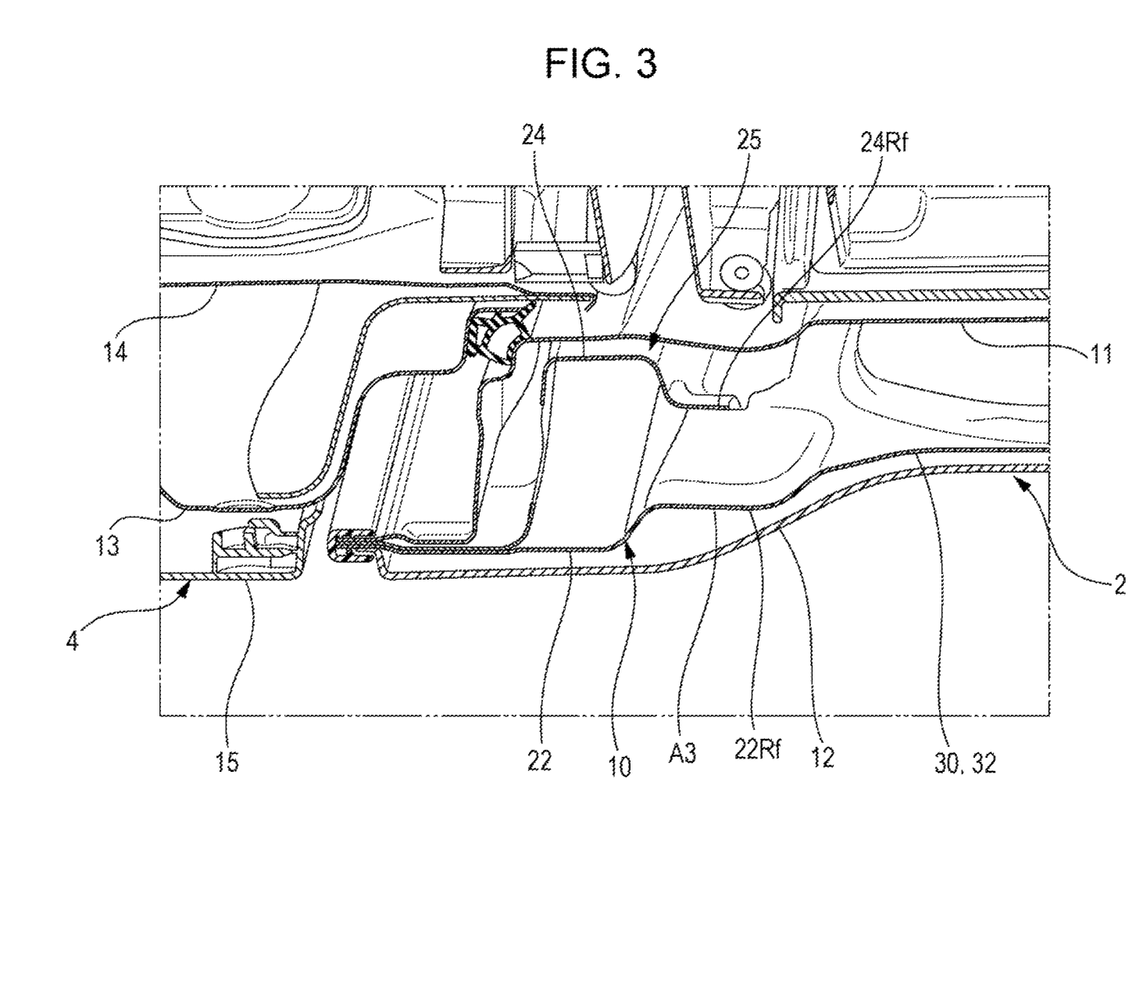
FIG. 3 is an enlarged view of portion III shown in FIG. 2.
Figure 4:
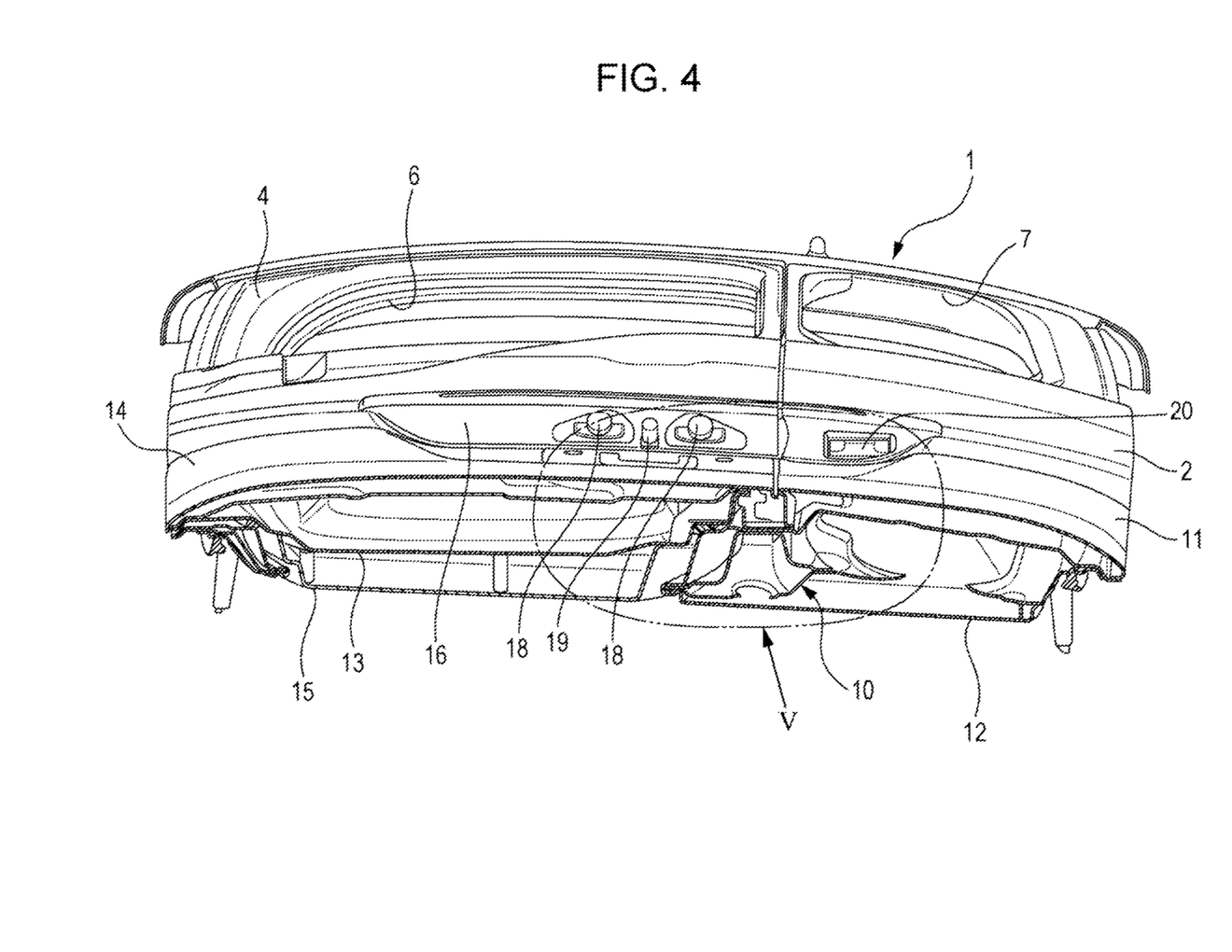
FIG. 4 is a cross-sectional view of the tailgate according to the embodiment along line IV-IV shown in FIG. 1.
Figure 5:
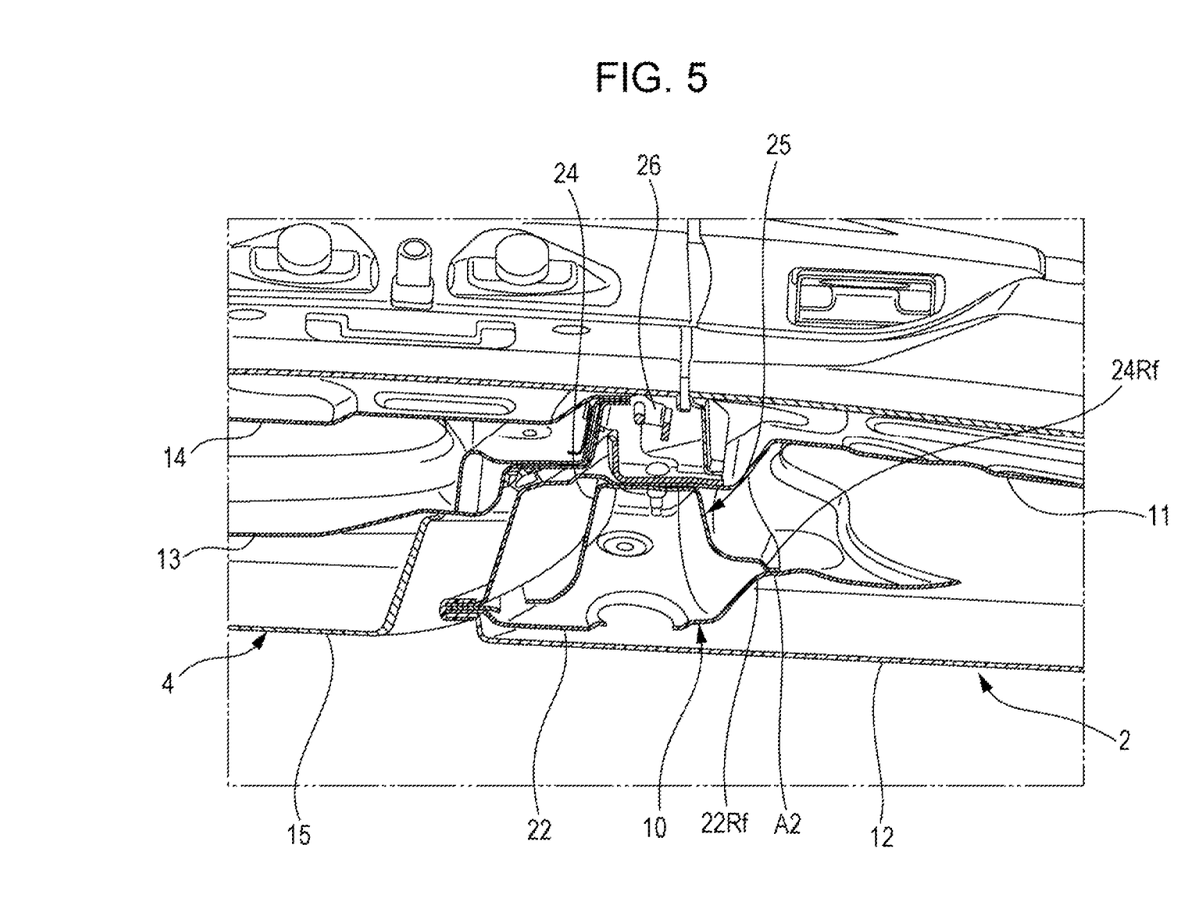
FIG. 5 is an enlarged view of portion V shown in FIG. 4.

FIG. 2 is a cross-sectional view of the tailgate 1 along line II-II shown in FIG. 1. FIG. 4 is a cross-sectional view of the tailgate 1 along line IV-IV shown in FIG. 1. FIG. 3 and FIG. 5 are an enlarged view of portion III shown in FIG. 2 and an enlarged view of portion V shown in FIG. 4, respectively.

As shown in FIGS. 2 to 5, the tailgate body 2 includes a metallic tailgate frame 10, a skin unit 11 mounted on the vehicle-body exterior side of the tailgate frame 10, and a lining 12 mounted on the vehicle-body interior side of the tailgate frame 10. The door 4 includes a metallic door frame 13, a skin unit 14 mounted on the vehicle-body exterior side of the door frame 13, and a lining 15 mounted on the vehicle-body interior side of the door frame 13.

A handle 16 held when the tailgate 1 is swung upward is provided so as to form a downwardly opening recess at about one-third the height of the door 4 and the tailgate body 2 away from the lower end of the skin units 14 and 11. A plate mounting portion 17 on which a license plate is mounted is provided below the handle 16 of the skin units 14 and 11. A pair of lamps 18 for illuminating the license plate, and a camera 19 for capturing an image around the lower tail of the vehicle body are installed inside the opening recess of the handle 16 on the door 4 side. A switch 20 for releasing a locking mechanism of the tailgate 1 is installed inside the opening recess of the handle 16 on the tailgate body 2 side.

In this embodiment, each of the lamp 18, camera 19, and switch 20, etc., is a functional component connected to the distribution cable 8, which is the linear member.

Figure 6:
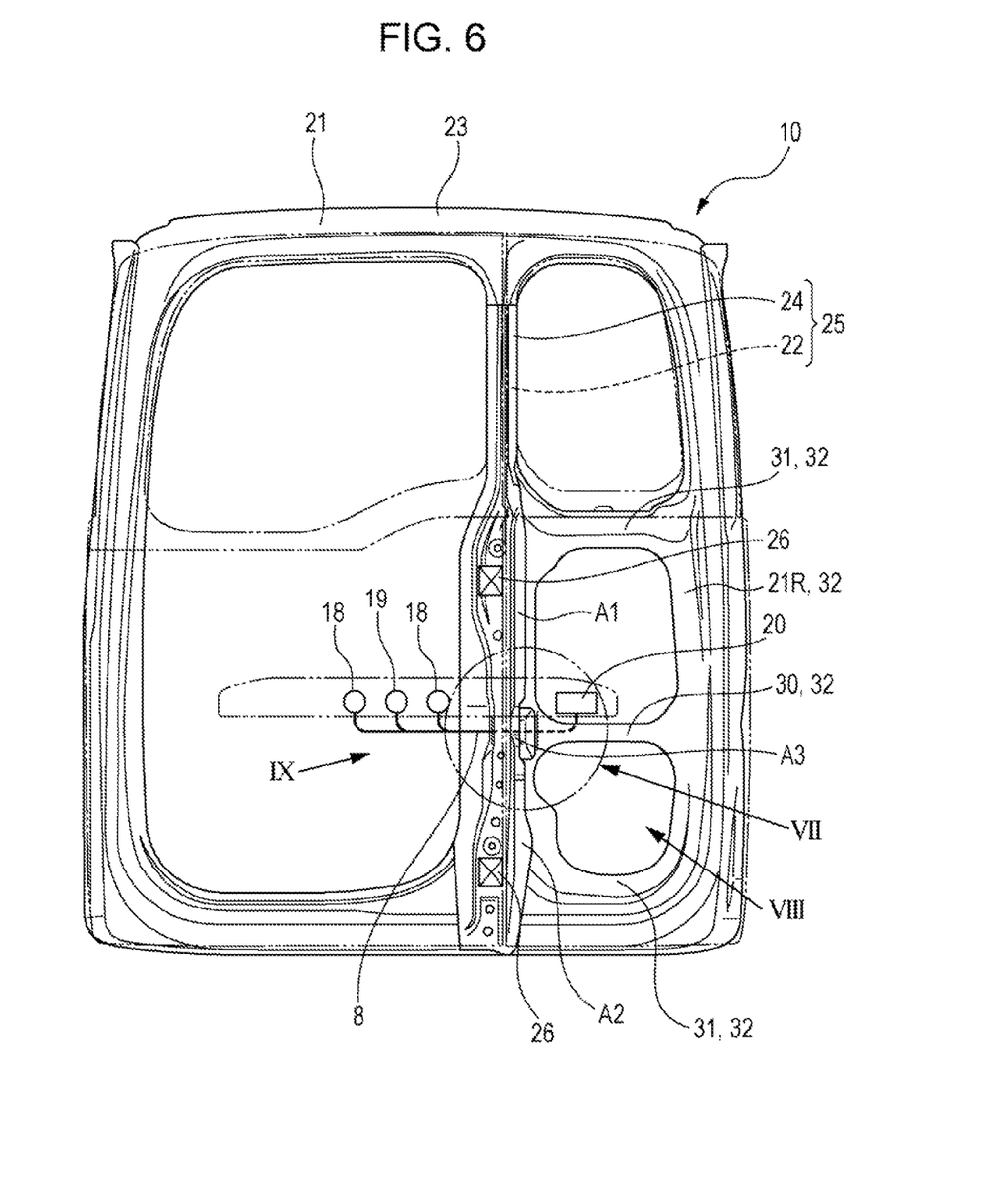
FIG. 6 is a front view of a tailgate frame according to the embodiment.
Figure 7:
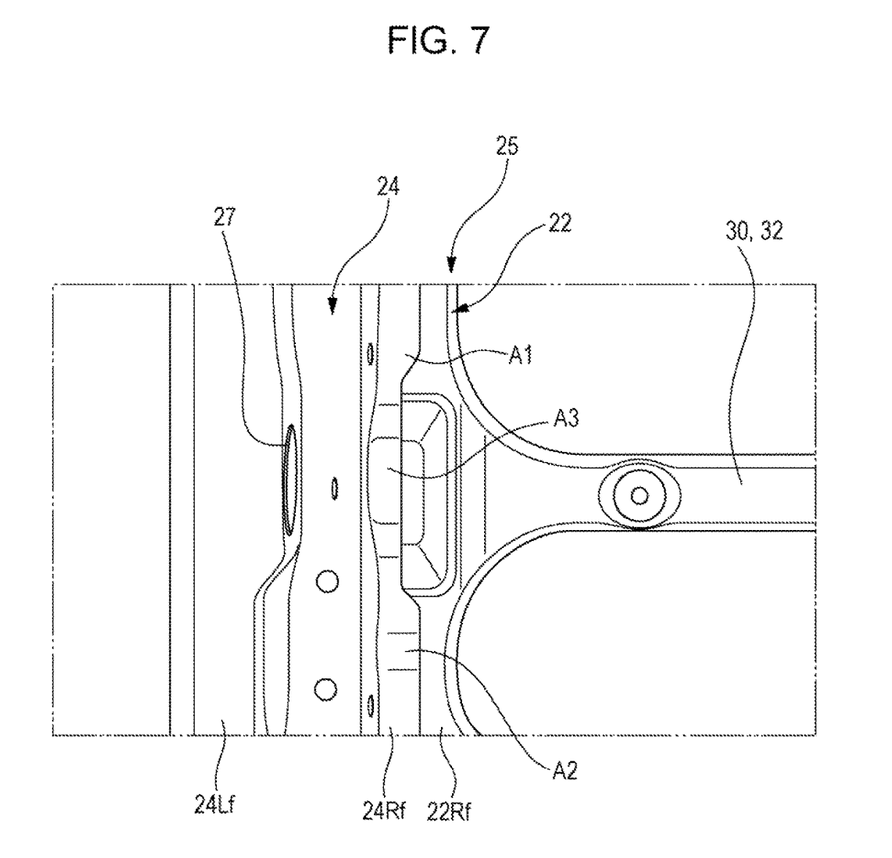
FIG. 7 is an enlarged view of portion VII shown in FIG. 6.
Figure 8:
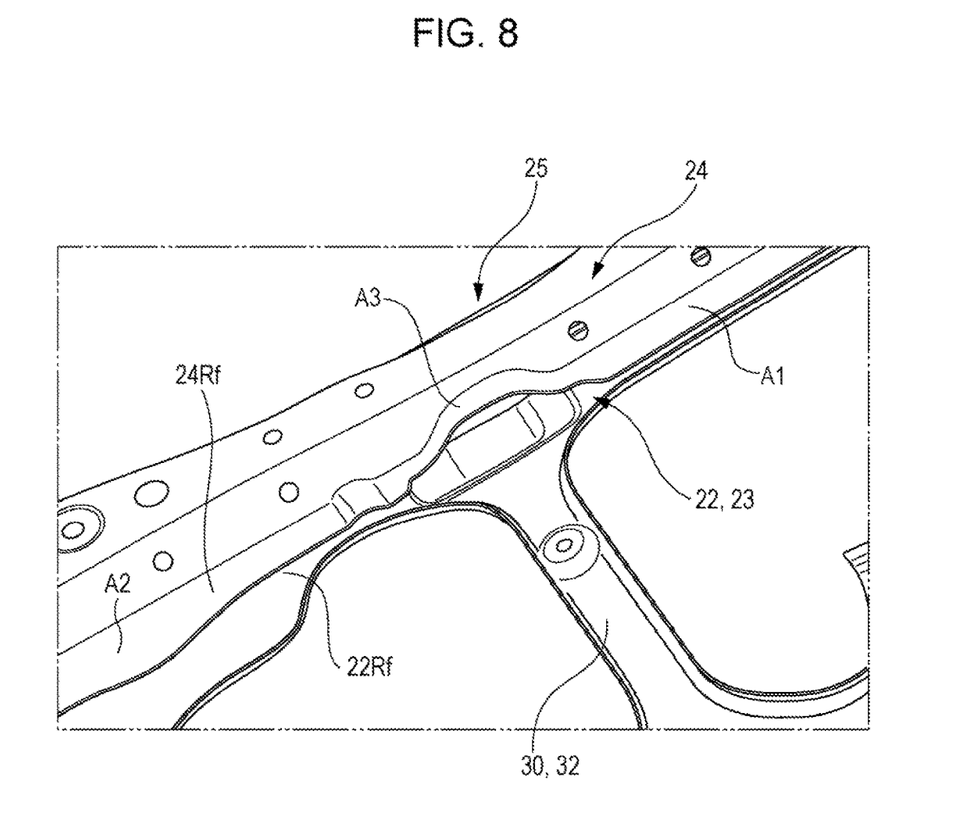
FIG. 8 is a perspective view of the tailgate frame according to the embodiment taken in the direction of arrow VIII shown in FIG. 6.
Figure 9:
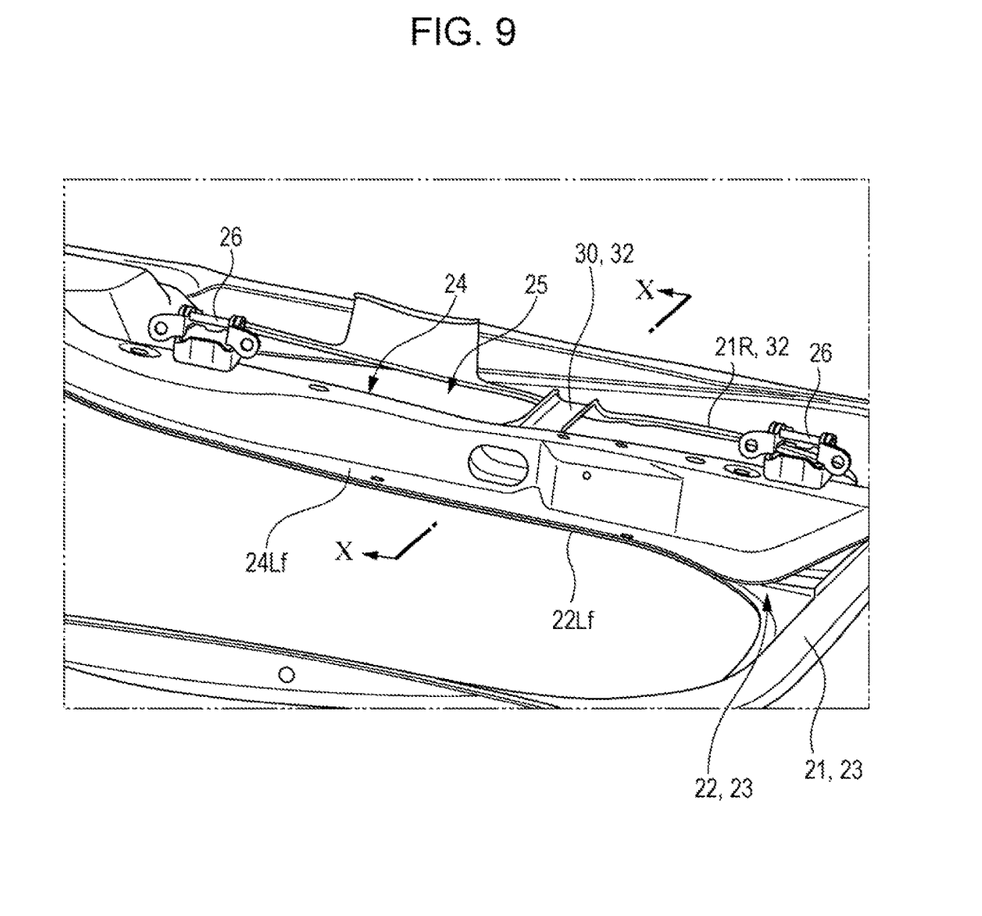
FIG. 9 is a perspective view of the tailgate frame according to the embodiment taken in the direction of arrow IX shown in FIG. 6.
Figure 10:
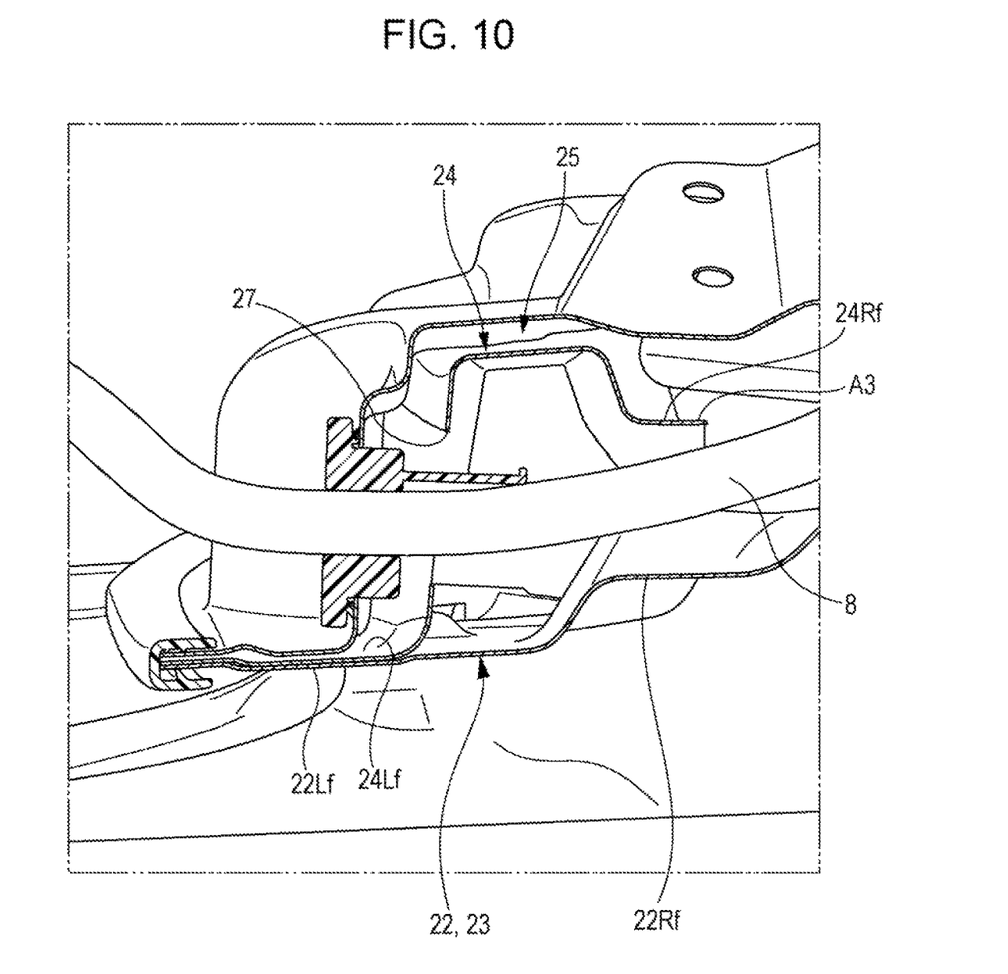
FIG. 10 is a cross-sectional view of the tailgate frame according to the embodiment along line X-X shown in FIG. 9.

FIG. 6 is a front view of the tailgate frame 10 viewed from the exterior of the vehicle. FIG. 7 is an enlarged view of portion VII shown in FIG. 6. FIG. 8 and FIG. 9 are perspective views taken in the direction of arrow VIII and arrow IX shown in FIG. 6. FIG. 10 is a cross-sectional view along line X-X shown in FIG. 9.

The tailgate frame 10 includes a frame body 23 including a substantially rectangular outer frame portion 21 and a pillar inner portion 22 (inner pillar) that divide the inside of the outer frame portion 21 into left and right sections, and a pillar outer 24 joined to the pillar inner portion 22 of the frame body 23 on the vehicle exterior side. The pillar inner portion 22 and the pillar outer 24 are joined on both the left and right sides to form the pillar 25 having a hollow cross section extending continuously in the up-and-down direction. The pillar 25 connects the upper side and lower side of the outer frame portion 21 of the tailgate frame 10 to reinforce the outer frame portion 21. A pair of hinges 26 that openably and closably support the door 4 are mounted on the vehicle exterior side of the pillar outer 24 of the pillar 25.

Left and right side portions of the pillar inner portion 22 of the frame body 23 and left and right side portions of the pillar outer 24 include side flanges 22Lf and 22Rf and side flanges 24Lf and 24Rf that extend continuously in the longitudinal direction. The side flanges 22Lf and 22Rf face the side flanges 24Lf and 24Rf, respectively, in the front-and-rear direction of the vehicle body. The side flange 22Lf on the left side of the pillar inner portion 22 is joined to the side flange 24Lf on the left side of the pillar outer 24 over substantially the entire length of the pillar inner portion 22 and pillar outer 24.

In contrast, the side flanges 22Rf and 24Rf on the right side of the pillar inner portion 22 and the pillar outer 24 are mutually joined at a first junction region A1 on the upper side and a second junction region A2 on the lower side and mutually spaced at an opening-defining region A3 provided between the first junction region A1 and the second junction region A2. The first junction region A1, the second junction region A2, and the opening-defining region A3 overlap when viewed in the longitudinal direction. The opening-defining region A3 is formed by the side flange 22Rf of the pillar inner portion 22 and the side flange 24Rf of the pillar outer 24 that are curved in directions away from each other.

The opening-defining region A3 is situated at about one-third the height of the pillar 25 from the lower end of the pillar 25. The distribution cable 8 connected to the functional components, such as the switch 20, lamp 18, and camera 19, is inserted through the opening-defining region A3. A hole 27 through which the distribution cable 8 is led from the interior of the pillar 25 toward the door 4 is defined on a left side wall of the pillar outer 24 opposite to the opening-defining region A3.

A first reinforcing wall portion 30 is provided on the side flange 22Rf of the pillar inner portion 22 at the opening-defining region A3, so as to extend substantially horizontally from the side flange 22Rf toward the right side and be connected to the right side 21R of the outer frame portion 21. Second reinforcing wall portions 31 are provided on the side flange 22Rf of the pillar inner portion 22 at the first junction region A1 on the upper side and the second junction region A2 on the lower side, so as to extend substantially horizontally from the side flange 22Rf toward the right side and be connected to the right side 21R of the outer frame portion 21. In this embodiment, the lower second reinforcing wall portion 31 is formed by the lower side of the outer frame portion 21. In addition, in this embodiment, the right side 21R of the outer frame portion 21 serves as a connection wall portion connecting the first reinforcing wall portion 30 and the second reinforcing wall portions 31.

The opening-defining region A3 on the right side of the pillar 25 is connected to the first junction region A1 and the second junction region A2 via the first reinforcing wall portion 30 laterally extending from the pillar inner portion 22, the right side 21R of the outer frame portion 21, and the second reinforcing wall portions 31. In this embodiment, the first reinforcing wall portion 30, the right side 21R, and the second reinforcing wall portions 31 serve as a bypass connection wall 32.

One end of the first reinforcing wall portion 30 is connected to the opening-defining region A3 on the right side of the pillar 25 and also connected to the first and second junction regions A1 and A2 on the upper and lower sides of the opening-defining region A3 so as to extend over the first and second junction regions A1 and A2.

The opening-defining region A3 on the right side of the pillar 25 and the first reinforcing wall portion 30 connected to the opening-defining region A3 are situated at substantially the same level as the functional components, such as the lamp 18, camera 19, and switch 20. The opening-defining region A3 and the first reinforcing wall portion 30 are also situated at a substantially middle position between the upper and lower hinges 26 mounted on the pillar 25 in the height direction.

Thus, in the vehicle body structure according to the embodiment, because the opening-defining region A3 on the right side of the pillar 25 is connected to the rigid first and second junction regions A1 and A2 via the bypass connection wall 32, the opening-defining region A3, at which the pillar inner portion 22 and pillar outer 24 are mutually spaced and are not joined, is strongly reinforced and becomes rigid through the bypass connection wall 32. The vehicle body structure accordingly allows the pillar 25 to maintain a sufficiently high degree of flexural and torsional rigidity in the longitudinal direction, although the opening-defining region A3 is provided on the pillar 25 at a certain location in the longitudinal direction. Even when the linear member such as the distribution cable 8 inserted through the opening-defining region A3 has a large outer diameter, the rigidity of the pillar 25 can be prevented from being reduced.

In the vehicle body structure according to this embodiment, the bypass connection wall 32 is formed of the first reinforcing wall portion 30 connected to the opening-defining region A3 of the pillar 25, the second reinforcing wall portions 31 joined to the first junction region A1 and the second junction region A2 at a position apart from the first reinforcing wall portion 30 in the longitudinal direction of the pillar 25, and the right side 21R (connection wall portion) of the outer frame portion 21 connecting the first reinforcing wall portion 30 and the second reinforcing wall portions 31 at a position apart from the pillar 25. The first reinforcing wall portion 30, the right side 21R of the outer frame portion 21, and the second reinforcing wall portions 31 thereby allow the first junction region A1 and the second junction region A2 to firmly support a force acting on around the opening-defining region A3 of the pillar 25.

Although the second reinforcing wall portions 31 are provided above and below the first reinforcing wall portion 30 in order for the force acting on around the opening-defining region A3 of the pillar 25 to be carried by both of the first junction region A1 and the second junction region A2 in this embodiment, a single second reinforcing wall portion 31 may be provided above or below the first reinforcing wall portion 30.

In the vehicle body structure according to this embodiment, one end of the first reinforcing wall portion 30 is connected to the opening-defining region A3 and joined to the first and second junction regions A1 and A2 so as to extend over the first and second junction regions A1 and A2. Use of this structure allows the first junction region A1 and the second junction region A2 to be partially joined to each other via one end of the first reinforcing wall portion 30, thereby increasing the flexural and torsional rigidity of the pillar 25 in the longitudinal direction.

In the vehicle body structure according to the embodiment, the side portions of the pillar inner portion 22 and the pillar outer 24 include the side flange 22Rf and the side flange 24Rf that extend continuously in the longitudinal direction so as to face each other, and the opening-defining region A3 is formed by the side flange 22Rf of the pillar inner portion 22 and the side flange 24Rf of the pillar outer 24 that are curved in directions away from each other. Accordingly, the flexural rigidity of the pillar 25 in both of the thickness direction and width direction of the side portion can be enhanced by the side flanges 22Rf and 24Rf.

In the vehicle body structure according to the embodiment, because the opening-defining region A3 on the right side of the pillar 25 is situated at substantially the same level as the functional components, such as the lamp 18, camera 19, and switch 20, the distribution cable 8 can be sufficiently shortened to simplify routing of the distribution cable 8 when the distribution cable 8 for the lamp 18, camera 19, switch 20, and so on is routed by being inserted through the opening-defining region A3. Although the distribution cable 8 for the lamp 18, camera 19, switch 20, and so on is inserted through the opening-defining region A3 in this embodiment, a mechanical cable such as a cable for releasing a tailgate lock may be inserted through the opening-defining region A3.

In the vehicle body structure according to this embodiment, the opening-defining region A3 of the pillar 25 is situated at a substantially middle position between the two hinges 26. This position of the opening-defining region A3 of the pillar 25 is the farthest position from the two hinges 26 supporting the weight of the door. Accordingly, the load of the door 4 applied to the hinges 26 can be stably carried by portions of the pillar 25 that are advantageous in view of rigidity.

Embodiments are not limited to the embodiment described above; various alterations may be made without departing from the novel concept. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle body structure comprising:
   a pillar having a hollow cross section continuously extending in a longitudinal direction thereof and having a pillar inner and a pillar outer, wherein a side edge portion of the pillar inner is joined to a side edge portion of the pillar outer,
   wherein at least one lengthwise side of the pillar includes a junction region in which the side edge portion of the pillar inner and the side edge portion of the pillar outer are joined to each other, and an opening-defining region in which the side edge portion of the pillar inner is spaced apart from the side edge portion of the pillar outer,
   wherein the junction region includes a first junction region adjacent to the opening-defining region on one side thereof in the longitudinal direction and a second junction region adjacent to the opening-defining region on the other side thereof in the longitudinal direction, and
   wherein the vehicle body structure further includes a bypass connection wall connecting the opening-defining region to at least one of the first junction region and the second junction region, the bypass connection wall extending from at least one of the pillar inner and the pillar outer.

2. The vehicle body structure according to claim 1, wherein the bypass connection wall includes
   a first reinforcing wall portion connected to the opening-defining region,
   a second reinforcing wall portion joined to at least one of the first junction region and the second junction region at a position apart from the first reinforcing wall portion in the longitudinal direction of the pillar, and
   a connection wall portion connecting the first reinforcing wall portion and the second reinforcing wall portion at a position apart from the pillar.

3. The vehicle body structure according to claim 2, wherein one end of the first reinforcing wall portion is connected to the opening-defining region and joined to the first and second junction regions.

4. The vehicle body structure according to claim 2, wherein the side edge portions of the pillar inner and the pillar outer include side flanges respectively, the respective side flanges continuously extending in the longitudinal direction so as to face each other, and
   wherein in the opening-defining region, the side flange of the pillar inner and the side flange of the pillar outer are curved in directions away from each other.

5. The vehicle body structure according to claim 1,
   wherein the opening-defining region is disposed at substantially the same position in the longitudinal direction of the pillar as a functional component of a vehicle, and
   wherein the opening-defining region of the pillar defines an opening through which a linear member connected to the functional component passes.

6. The vehicle body structure according to claim 1, wherein the pillar is provided with a plurality of hinges that openably and closably support a door, the hinges being disposed apart from each other in the longitudinal direction, and
   wherein the opening-defining region of the pillar is disposed at a substantially middle position between adjacent two of the hinges in the longitudinal direction.

7. The vehicle body structure according to claim 1, wherein the bypass connection wall includes
   a first reinforcing wall portion connected to the opening-defining region,
   a second reinforcing wall portion joined to the first junction region at a position apart from the first reinforcing wall portion in the longitudinal direction of the pillar,
   a third reinforcing wall portion joined to the second junction region at a position apart from the first reinforcing wall portion in the longitudinal direction of the pillar, and
   a connection wall portion connecting the first reinforcing wall portion, the second reinforcing wall portion and the third reinforcing wall portion at a position apart from the pillar.

8. The vehicle body structure according to claim 3, wherein the one end of the first reinforcing wall portion extends from the first junction region to the second junction region.

9. The vehicle body structure according to claim 2, wherein the first reinforcing wall portion and the second reinforcing wall portion extend in a direction intersecting the longitudinal direction of the pillar.

10. The vehicle body structure according to claim 9, wherein the first reinforcing wall portion, the second reinforcing wall portion and the connection wall portion constitute a frame of a tailgate of a vehicle.

11. The vehicle body structure according to claim 1, wherein the bypass connection wall extends from at least one of the pillar inner and the pillar outer in a direction intersecting the longitudinal direction of the pillar.

12. The vehicle body structure according to claim 1, wherein the first junction region, the opening-defining region and the second junction region are substantially aligned in the longitudinal direction.

* * * * *